US012795296B2

(12) United States Patent
Song et al.

(10) Patent No.: US 12,795,296 B2
(45) Date of Patent: Nov. 10, 2026

(54) HOLOGRAPHIC-BASED DIRECTIONAL AUDIO DEVICE CAPABLE OF SOUND WAVE SCANNING

(71) Applicants: Pusan National University Industry-University Cooperation Foundation, Busan (KR); CENTER FOR ADVANCED META-MATERIALS, Daejeon (KR)

(72) Inventors: Kyungjun Song, Busan (KR); Md Tausif Akram, Busan (KR); Jun Young Jang, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 53 days.

(21) Appl. No.: 18/864,063

(22) PCT Filed: Jan. 30, 2023

(86) PCT No.: PCT/KR2023/001344

§ 371 (c)(1),
(2) Date: Nov. 8, 2024

(87) PCT Pub. No.: WO2023/219228

PCT Pub. Date: Nov. 16, 2023

(65) Prior Publication Data

US 2025/0310681 A1 Oct. 2, 2025

(30) Foreign Application Priority Data

May 10, 2022 (KR) ........................ 10-2022-0057170

(51) Int. Cl.
*H04R 1/34* (2006.01)
*G03H 1/02* (2006.01)

(52) U.S. Cl.
CPC ............... *H04R 1/345* (2013.01); *G03H 1/02* (2013.01)

(58) Field of Classification Search
CPC . H04R 1/345; H04R 1/32; H04R 1/34; G03H 1/02
See application file for complete search history.

(56) References Cited

U.S. PATENT DOCUMENTS 10,652,637 B2 * 5/2020 Zhao ....................... H04R 1/021
2017/0069303 A1 * 3/2017 Song ....................... G10K 11/08
2018/0336877 A1 * 11/2018 Urzhumov ............ G01S 15/897
2019/0364362 A1 * 11/2019 Subramanian ....... G01N 29/221

FOREIGN PATENT DOCUMENTS

KR 10-2151358 B1 9/2020

* cited by examiner

*Primary Examiner* — Jason R Kurr
(74) *Attorney, Agent, or Firm* — NSIP Law

(57) ABSTRACT

Proposed is a holographic-based directional audio device capable of sound wave scanning to adjust an emission angle of a sound wave through a frequency change of the sound wave. The holographic-based directional audio device includes a sound wave generator configured to generate the sound wave, a flat plate positioned at a side of the sound wave generator, and a holographic meta-surface composed of a plurality of unit cells, each of which comprises a plurality of grooves formed on a surface of the flat plate and which is continuously arrayed, and configured to emit the sound wave.

5 Claims, 13 Drawing Sheets

FIG. 21

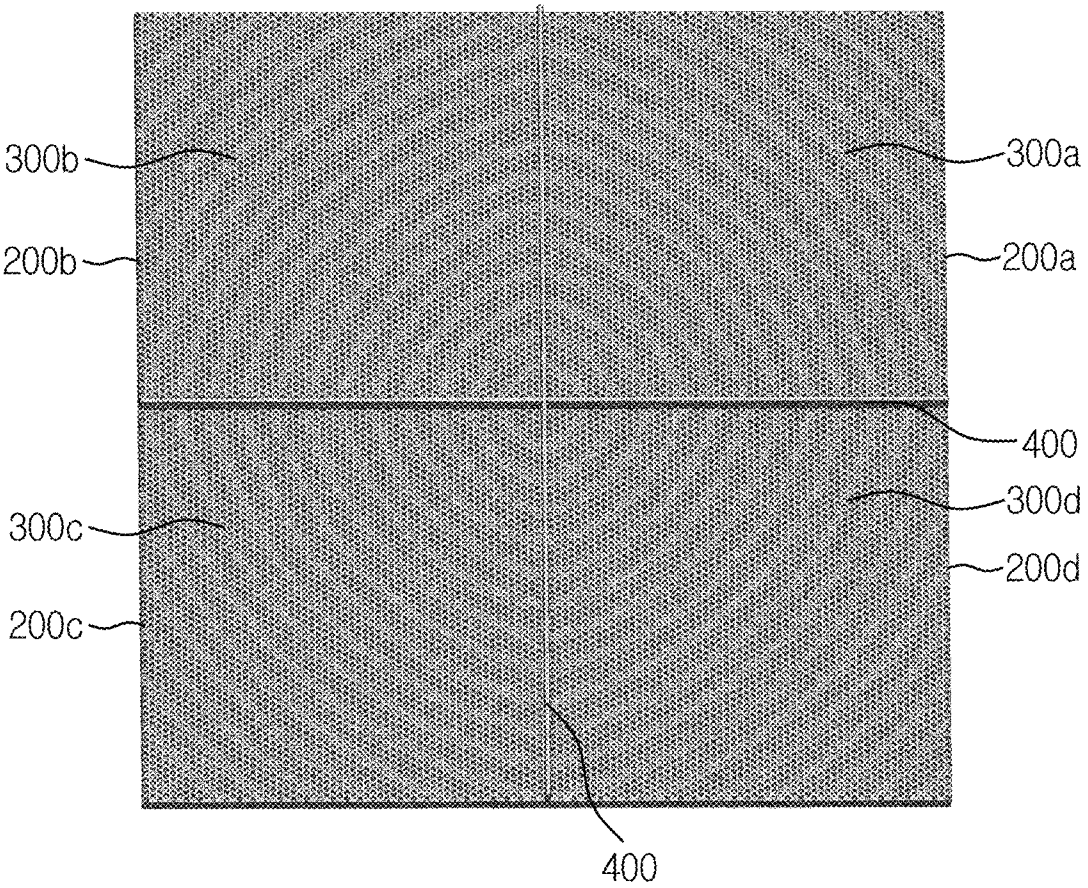

FIG. 22

$$\psi_{rad} = \begin{cases} e^{-jk\sin(\theta)[x\cos(\varphi)+y\sin(\varphi)]} & x>0, y>0 \text{ [FIRST QUADRANT]} \\ e^{-jk\sin(\theta)[-x\cos(\varphi)+y\sin(\varphi)]} & x<0, y>0 \text{ [SECOND QUADRANT]} \\ e^{-jk\sin(\theta)[-x\cos(\varphi)-y\sin(\varphi)]} & x<0, y<0 \text{ [THIRD QUADRANT]} \\ e^{-jk\sin(\theta)[x\cos(\varphi)-y\sin(\varphi)]} & x>0, y<0 \text{ [FOURTH QUADRANT]} \end{cases}$$

FIG. 23

$$\psi_{rad} = \begin{cases} e^{jk\sin(\theta)[x\cos(\varphi)+y\sin(\varphi)]} & x>0, y>0 \text{ [FIRST QUADRANT]} \\ e^{jk\sin(\theta)[-x\cos(\varphi)+y\sin(\varphi)]} & x<0, y>0 \text{ [SECOND QUADRANT]} \\ e^{jk\sin(\theta)[-x\cos(\varphi)-y\sin(\varphi)]} & x<0, y<0 \text{ [THIRD QUADRANT]} \\ e^{jk\sin(\theta)[x\cos(\varphi)-y\sin(\varphi)]} & x>0, y<0 \text{ [FOURTH QUADRANT]} \end{cases}$$

HOLOGRAPHIC-BASED DIRECTIONAL AUDIO DEVICE CAPABLE OF SOUND WAVE SCANNING

CROSS-REFERENCE TO RELATED APPLICATIONS

This application is a U.S. national stage application of international application No. PCT/KR2023/001344 filed on Jan. 30, 2023, which claims the benefit under 35 U.S.C. 119(a) of Korean patent application No. 10-2022-0057170 filed on May 10, 2022, in the Korean Intellectual Property Office, the entire disclosure of which are incorporated herein by reference for all purposes.

TECHNICAL FIELD

The present disclosure relates to a holographic-based directional audio device capable of sound wave scanning.

BACKGROUND ART

Since common audio devices have non-directionality and emit sound waves generated by a sound wave generator in all directions without directionality, they have a limitation that sound waves are not emitted in specific directions while being distributed in all directions and do not reach specific distances.

In order to overcome this limitation, an audio device that guides a sound wave, which is transmitted from a sound wave generator, in a specific direction by installing a blocking plate, a horn, or the like outside or ahead of the sound wave generator, an audio device that guides sound waves, which are transmitted from a plurality of sound wave generators, in a specific direction by arraying the sound wave generators in a predetermined shape, such as radially, and fixing the sound wave generators through fixing members to maintain the array shape, etc. are being developed.

However, according to these audio devices, since a blocking plate, a horn, or the like is additionally installed at a sound wave generator or a plurality of sound wave generators is used and a separate fixing structure for supporting the sound wave generators is required, the volume increases and a wide installation space needs to be ensured by the increased volume, so there is a problem that installation is not easy, and installation is difficult when the installation space is insufficient.

Accordingly, research and development of directional audio devices that increase usability of space by minimizing the volume, remove the limitation accompanying installation, and can emit sound waves in specific directions is being conducted in the field of acoustic applications.

As the result of the research and development, a directional audio device that can emit a sound wave in a specific direction by configuring surface admittance into a periodical sine function or cosine function and having high directionality at a specific frequency because a sound wave generator that generates a sound wave is installed at the center and a flat plate having a plurality of grooves formed on the surface is provided has been developed.

However, the directional audio device has a limitation that it can emit a sound wave only in a direction perpendicular to the flat plate in accordance with the depths, widths, and gaps of the groove formed on the surface of the flat plate and it cannot emit a sound wave in other directions except for the perpendicular direction.

Due to this limitation, it is required to fix the flat plate using a separate fixing member and adjust the installation angle to the transmission direction of a sound wave, so there is a problem that the structure becomes complicated, the volume is also increased, the manufacturing cost is increased, and the installation space is increased due to addition of a fixing member.

In order to solve this problem, as shown in FIG. 1, a holographic-based directional audio device 10 that has a holographic meta-surface 11 formed on the surface of a flat plate 10 and can emit a sound wave at a predetermined angle has been developed.

However, the holographic-based directional audio device 10 is a type having surface admittance equally including a forward dominant region that implements a forward emission mode in which a holographic meta-surface 13 formed on the surface of the flat plate 12 on which a sound wave generator 11 is positioned at the center emits a sound wave in a forward direction the same as the traveling direction of a surface wave and a backward dominant region that implements a backward emission mode in which the holographic meta-surface 13 emits a sound wave in a backward direction opposite to the traveling direction of the surface wave.

Accordingly, as shown in FIGS. 2 and 3, a sound wave is emitted in a single beam type in a specific frequency domain, but, as shown in FIG. 4, a frequency scanning phenomenon in which a sound wave is emitted in a beam splitting type rather than a beam type while being distributed in a forward direction and a backward direction in another specific frequency domain is caused, so there is a problem that when the frequency of the sound wave is changed to adjust the emission angle of the sound wave, the sound wave is split into a plurality of beams and loses directionality.

Accordingly, it is required to improve the structure of holographic-based directional audio devices in order to be able to emit a sound wave with directionality at an angle corresponding to the frequency without a frequency scanning phenomenon, in which a sound wave is emitted in a beam splitting type, even though the emission angle of the sound wave is adjusted by changing the frequency of the sound wave.

DISCLOSURE

Technical Problem

The present disclosure has been made in an effort to solve the problems described above and an objective of the present disclosure is to provide a holographic-based directional audio device capable of sound wave scanning, in which a holographic meta-surface that emits a sound wave in a forward direction or a backward direction is formed on the surface of a flat plate, so it is possible to adjust the emission angle of a sound wave with directionality by changing the frequency of the sound wave in order to be able to emit a sound wave with directionality at an angle corresponding to the frequency without a frequency scanning phenomenon, in which a sound wave is emitted in a beam splitting type, even though the emission angle of the sound wave is changed by changing the frequency of the sound wave.

The objectives of the present disclosure are not limited to the objective described above and other objectives not stated herein can be definitely understood from the following description and can be sufficiently included in the objectives of the present disclosure.

Technical Solution

In order to achieve the objectives, a holographic-based directional audio device capable of sound wave scanning according to the present disclosure is for adjusting an emission angle of a sound wave through a frequency change of the sound wave. The holographic-based directional audio device capable of sound wave scanning includes: a sound wave generator configured to generate the sound wave; a flat plate positioned at a side of the sound wave generator; and a holographic meta-surface composed of a plurality of unit cells, each of which comprises a plurality of grooves formed on a surface of the flat plate and which is continuously arrayed, and configured to emit the sound wave, wherein a depth of the grooves constituting the holographic meta-surface is determined by surface admittance calculated on the basis of a cosine function or a sine function of a sum of a first value that is a product of a frequency of the sound wave, a refractive index according to a surface of the unit cell, and a radial distance from a center of the flat plate to the unit cell and a second value that is a product of the frequency of the sound wave, a position value of the unit cell, and an emission angle of the sound wave on the basis of preset emission angle and frequency of the sound wave; and the surface admittance makes the sound wave be emitted in a forward direction the same as a traveling direction of a surface wave traveling along the holographic meta-surface or a backward direction opposite to the traveling direction of the surface wave, so the emission angle of the sound wave can be adjusted in accordance with frequency variation of the sound wave.

The flat plate may include a plurality of flat plates disposed to be connected to each other around a position of the sound wave generator, and the flat plates may have different holographic meta-surfaces to have different surface admittance in accordance with positions, so the flat plates may implement a multi-beam type in which the flat plates emit sound waves at different angles, respectively.

The holographic meta-surfaces formed on the plurality of flat plates may be obtained by mirroring the holographic meta-surface formed on any one flat plate of the plurality of flat plates to correspond to each other in accordance with positions.

The holographic-based directional audio device may further include anti-interference walls formed to protrude along boundaries of the plurality of flat plates and configured to prevent interference between reflective waves traveling along the holographic meta-surfaces, respectively, in accordance with a sound wave.

The plurality of flat plates may include a first flat plates, a second flat plate, a third flat plate, and a fourth flat plate that have a rectangular shape; the first flat plate may be disposed in a first quadrant, the second flat plate may be disposed in a second quadrant, the third flat plate may be disposed in a third quadrant, the fourth flat plate may be disposed in a fourth quadrant; the holographic meta-surface of the second flat plate may be obtained by mirroring, in a left-right direction, the holographic meta-surface of the first flat plate, the holographic meta-surface of the third flat plate may be obtained by mirroring, in a diagonal direction, the holographic meta-surface of the first flat plate, and the holographic meta-surface of the fourth flat plate may be obtained by mirroring, in an up-down direction, the holographic meta-surface of the first flat plate; and the anti-interference walls may be installed in a left-right direction and a front-rear direction along boundaries of the first flat plate, the second flat plate, the third flat plate, and the fourth flat plate.

Advantageous Effects

It is possible to expect the following effects from the holographic-based directional audio device capable of sound wave scanning having this configuration in accordance with the present disclosure.

First, since a holographic meta-surface having a forward emission mode or a backward emission mode is formed on the surface of a flat plate, it is possible to emit a sound wave with directionality in the emission angle through frequency variation of the sound wave, so it is possible to prevent a frequency scanning phenomenon.

Further, a plurality of flat plates is integrally coupled around a sound wave generator and different holographic meta-surfaces having a forward emission mode or a backward emission mode are formed on the surfaces of the flat plates, respectively, so it is possible to emit a plurality of separate sound waves at different angles, whereby it is possible to implement a multi-beam emission type.

Further, since anti-interference walls are formed to protrude along the boundaries of a plurality of flat plates, it is possible to prevent interference of sound waves that are emitted through the holographic meta-surfaces, so it is possible to more precisely implement a multi-beam type.

DESCRIPTION OF DRAWINGS

FIG. 21 is an exemplary view showing the state in which anti-interference walls have been added to the second embodiment of the holographic-based directional audio device capable of sound wave scanning according to the present disclosure.

FIG. 22 is an equation representing the radiation waves of sound waves according to the first holographic meta-surface, the second holographic meta-surface, the third holographic meta-surface, and the fourth holographic meta-surface of the first flat plate, the second flat plate, the third flat plate, and the fourth flat plate, in accordance with the first embodiment.

FIG. 23 is an equation representing the radiation waves of sound waves according to the first holographic meta-surface, the second holographic meta-surface, the third holographic meta-surface, and the fourth holographic meta-surface of the first flat plate, the second flat plate, the third flat plate, and the fourth flat plate, in accordance with the second embodiment.

BEST MODE

Figure 1:
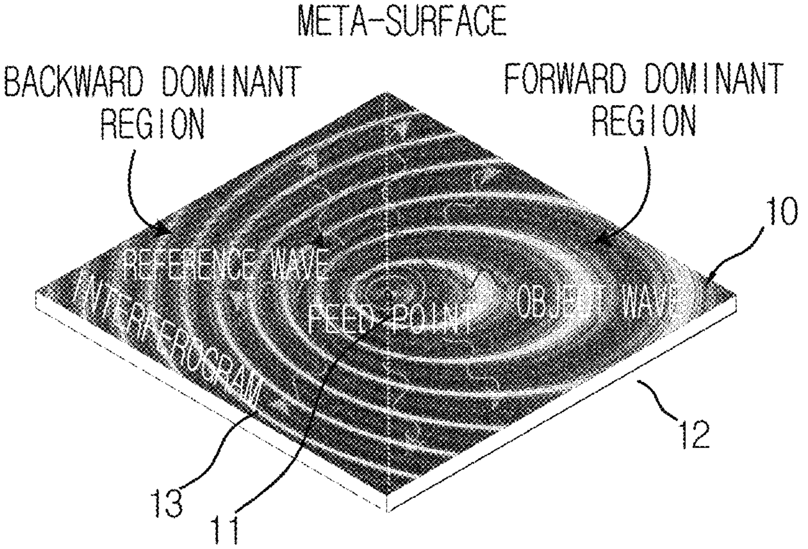
FIG. 1 is a configuration view showing a holographic-based directional audio device of the related art.
Figure 2:
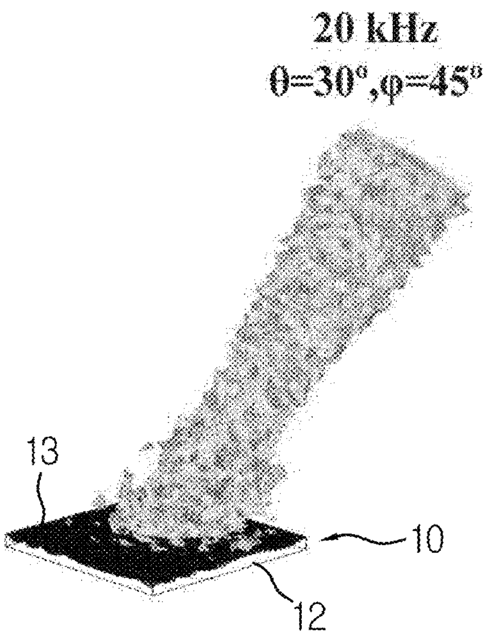
FIG. 2 is an exemplary view showing the state in which a sound wave is emitted in a single beam type at a specific frequency from the holographic-based directional audio device of the related art.
Figure 3:
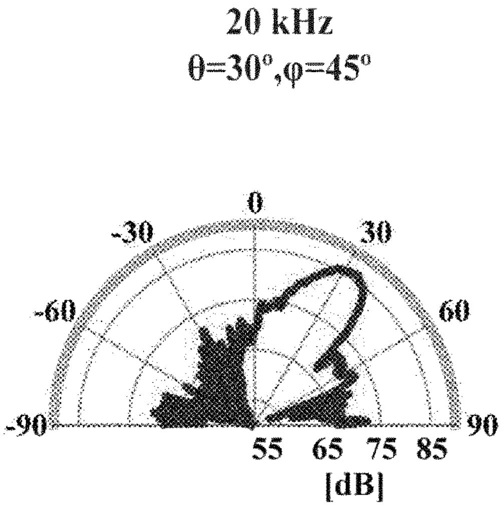
FIG. 3 is an image of a peak sound pressure level according to an XZ plane showing the state of FIG. 2.

In order to achieve the objectives, a holographic-based directional audio device capable of sound wave scanning according to the present disclosure is for adjusting an emission angle of a sound wave through a frequency change of the sound wave. The holographic-based directional audio device capable of sound wave scanning includes: a sound wave generator configured to generate the sound wave; a flat plate positioned at a side of the sound wave generator; and a holographic meta-surface composed of a plurality of unit cells, each of which comprises a plurality of grooves formed on a surface of the flat plate and which is continuously arrayed, and configured to emit the sound wave, wherein a depth of the grooves constituting the holographic meta-surface is determined by surface admittance calculated on the basis of a cosine function or a sine function of a sum of a first value that is a product of a frequency of the sound wave, a refractive index according to a surface of the unit cell, and a radius distance from a center of the flat plate to the unit cell and a second value that is a product of the frequency of the sound wave, a position value of the unit cell, and an emission angle of the sound wave on the basis of preset emission angle and frequency of the sound wave; and the surface admittance makes the sound wave be emitted in a forward direction the same as a traveling direction of a surface wave traveling along the holographic meta-surface or a backward direction opposite to the traveling direction of the surface wave, so the emission angle of the sound wave can be adjusted in accordance with frequency variation of the sound wave.

The flat plate may include a plurality of flat plates disposed to be connected to each other around the sound wave generator, and the flat plates may have different holographic meta-surfaces to have different surface admittance in accordance with positions, so the flat plates may implement a multi-beam type in which the flat plates emit sound waves at different angles, respectively.

The holographic meta-surfaces formed on the plurality of flat plates may be obtained by mirroring the holographic meta-surface formed on any one flat plate of the plurality of flat plates to correspond to each other in accordance with positions.

The holographic-based directional audio device may further include anti-interference walls formed to protrude along boundaries of the plurality of flat plates and configured to prevent interference between reflective waves traveling along the holographic meta-surfaces, respectively, in accordance with a sound wave.

The plurality of flat plates may include a first flat plates, a second flat plate, a third flat plate, and a fourth flat plate that have a rectangular shape; the first flat plate may be disposed in a first quadrant, the second flat plate may be disposed in a second quadrant, the third flat plate may be disposed in a third quadrant, the fourth flat plate may be disposed in a fourth quadrant; the holographic meta-surface of the second flat plate may be obtained by mirroring, in a left-right direction, the holographic meta-surface of the first flat plate, the holographic meta-surface of the third flat plate may be obtained by mirroring, in a diagonal direction, the holographic meta-surface of the first flat plate, and the holographic meta-surface of the fourth flat plate may be obtained by mirroring, in an up-down direction, the holographic meta-surface of the first flat plate; and the anti-interference walls may be installed in a left-right direction and a front-rear direction along boundaries of the first flat plate, the second flat plate, the third flat plate, and the fourth flat plate.

MODE FOR INVENTION

The present disclosure relates to a holographic-based directional audio device capable of sound wave scanning that can emit a sound wave, which is generated from a sound wave generator, with directionality through surface admittance according to a groove pattern formed on the surface of a flat plate.

In particular, the holographic-based directional audio device capable of sound wave scanning according to the present disclosure is characterized by being able to freely adjust the emission angle of a sound wave by preventing a frequency scanning phenomenon, in which a sound wave is emitted in a beam splitting type, while being distributed into a forward direction and a backward direction, when the frequency of the sound wave is changed to adjust the emission angle of the sound wave.

This characteristic can be achieved by a structure designed such that a holographic meta-surface according to a combination of a plurality of unit cells composed of a plurality of grooves is formed on the surface of a flat plate and surface admittance emitting a sound wave in a forward direction of a backward direction of the surface admittance of the holographic meta-surface is dominant.

Hereafter, a holographic-based directional audio device capable of sound wave scanning according to an exemplary embodiment of the present disclosure is described in detail with respect to the accompanying drawings.

Figure 7:
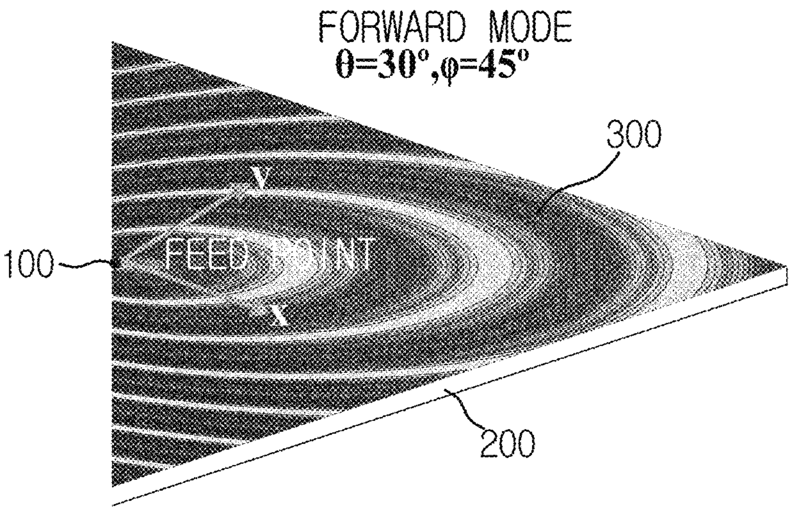
FIG. 7 is an exemplary view in which a holographic meta-surface having a forward emission mode has been applied to a holographic-based directional audio device capable of sound wave scanning according to the present disclosure.
Figure 9:
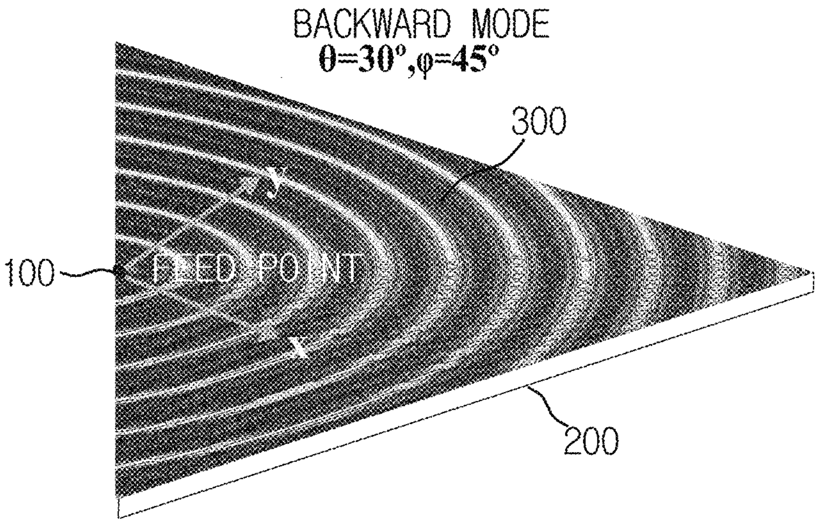
FIG. 9 is an exemplary view in which a holographic meta-surface having a backward emission mode has been applied to a holographic-based directional audio device capable of sound wave scanning according to the present disclosure.

A holographic-based directional audio device capable of sound wave scanning according to an exemplary embodiment of the present disclosure, as shown in FIGS. 7 and 9, may include a sound wave generator 100, a flat plate 200, a holographic meta-surface 300, and a sound wave receiver (not shown).

First, the sound wave generator 100 can generate a sound wave.

The sound wave generator may be a speaker that generates an acoustic wave, an ultrasonic generator that generates an ultrasonic wave, an underwater ultrasonic generator that generates a sound wave or an ultrasonic wave, etc.

Next, the flat plate 200 may be a flat plate having a predetermined thickness and may be installed at a side of the sound wave generator 100.

However, the shape of the flat plate 200 can be maintained and the flat plate 200 may be made of a hard synthetic resin material to be able to precisely machining the holographic meta-surface 300 on the surface thereof.

Next, the holographic meta-surface 300 is formed in a 3D type on the surface of the flat plate 200 and can receive and emit a sound wave, which is generated by the sound wave generator 10, at an angle corresponding to the frequency of the sound wave.

Figure 5:
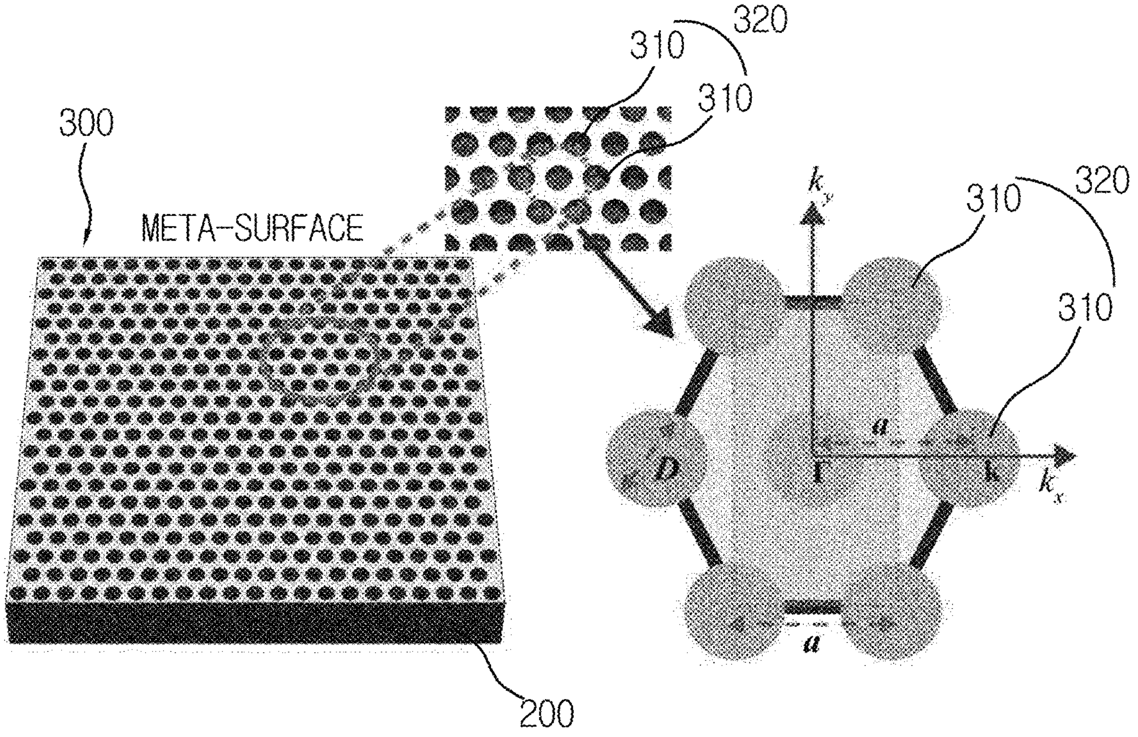
FIG. 5 is an exemplary view showing a holographic meta-surface and unit cells according to an exemplary embodiment of the present disclosure.
Figure 6:
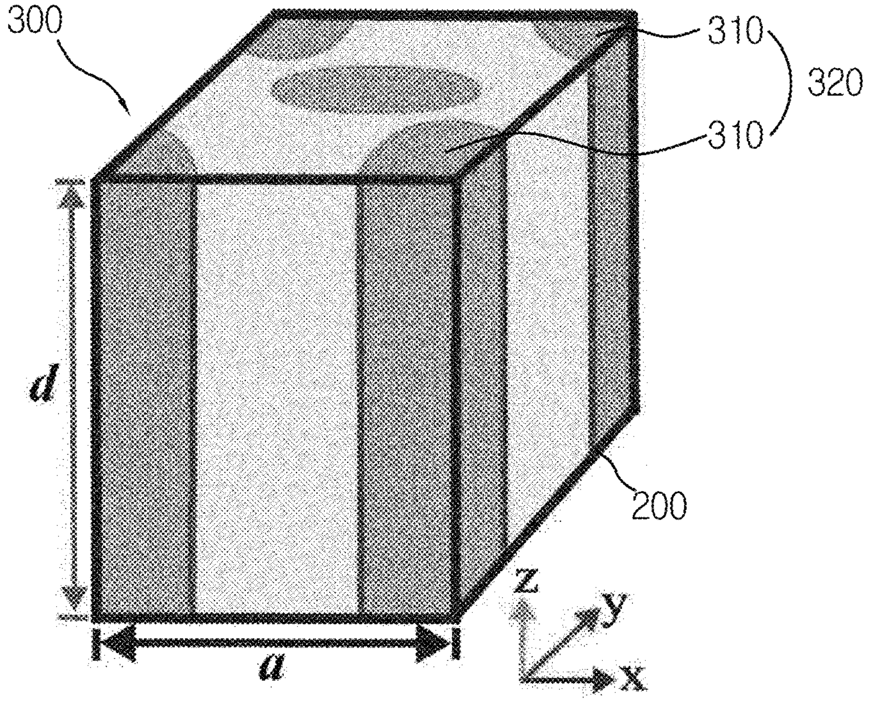
FIG. 6 is a 3D image showing some of the unit cells of FIG. 5.

The holographic meta-surface 300, as shown in FIGS. 5 and 6, may have a type in which unit cells 320, in which a plurality of cylindrical grooves 310 is disposed in a hexagonal pattern, are sequentially arrayed on the surface of the flat plate 200.

That is, the plurality of grooves 310 is disposed at the corners and the center according to a hexagonal pattern, respectively, with gaps therebetween, thereby being able to configure one unit cell 320. The plurality of unit cells 320 is sequentially arrayed, thereby being able to configure the holographic meta-surface 300.

Further, the holographic meta-surface 300 may have surface admittance for converting a surface wave according to a sound wave into a radiation wave and emitting the radiation wave at a predetermined angle, and the surface admittance of the holographic meta-surface 300 can be determined by a combination of a plurality of unit cells 320 according to the diameter D, depth d, and gap a of a plurality of grooves 310.

In this configuration, the diameter D, depth d, and gap of the plurality of grooves 310 constituting the unit cell 320 may be smaller than the wavelength of a sound wave. Further, the plurality of grooves 310 constituting the unit cell 320 may be formed on a polygonal shape including a rectangle, a hexagon, an octagon, etc., other than a cylindrical shape.

The individual surface admittance of each unit cell 320 may be individually determined by the depth of the plurality of grooves 310 constituting the unit cell 32, and the emission angle of a sound wave that is emitted by the holographic meta-surface 300 may be determined by a combination of individual surface admittance.

In this case, the individual surface admittance of each unit cell 320 can be calculated from the following Equation 1.

$$Y = jY_0 Y_{avg}[1 + M\cos(knr + kx\sin\theta)] \quad \text{[Equation 1]}$$

$Y_0$ is the surface admittance of a surrounding medium, $Y_{avg}$ is the average surface admittance of the surface of a flat plate, M is a modulation depth, k is the frequency of a sound wave, n is a refractive index that is determined in advance in accordance with the plane structure of the flat plate, r is a radius distance from the center of the flat plate to a unit cell 320, and x is the position of a unit cell 320 on the surface of the flat plate.

That is, by applying preset emission angle and frequency of a sound wave to Equation 1, it is possible to calculate the individual surface admittance of each of unit cells 320 constituting the holographic meta-surface 300 and it is possible to calculate the depth of the plurality of grooves 310 constituting each unit cell 320 through the calculated individual surface admittance of each unit cell 320.

Accordingly, when a plurality of grooves 310 constituting each unit cell 320 is formed with the depth corresponding to the individual surface admittance of each of the unit cells 320 constituting the holographic meta-surface 300 by applying predetermined emission angle and frequency of a sound wave to Equation 1, a sound wave generated by the sound wave generator 100 can be emitted at the predetermined emission angle through the surface admittance of the holographic meta-surface 300 according to the combination of the plurality of grooves 310 constituting each unit cell 320.

In this case, a radiation wave $\Psi_{rad}$ according to a sound wave should be considered to emit a sound wave in a single beam type on the basis of an elevation angle θ and an azimuth φ in an XY plane, the surface wave according to a sound wave may be defined as in the following Equation 2, and the interference relationship of the surface wave $$\Psi_{surf} = e^{-jknx}$$

and the radial wave may be defined as in the following Equation 3.

$$\psi_{rad} = e^{-jsin(\theta)k[xcos(\varphi)+ysin(\varphi)]} \quad \text{[Equation 2]}$$

$$\frac{Y}{jY_0} = Y_{avg}\left[X + M\ \mathrm{Re}\left(\Psi^*_{surf}\Psi_{rad}\right)\right] = Y_{avg}[X + M\cos(knr - kx\sin(\theta)\cos(\varphi) - ky\sin(\theta)\sin(\varphi))] \quad \text{[Equation 3]}$$

where k is a frequency $$\left(k = \frac{2\pi}{\lambda}\right),$$

r is the radiation distance from the center of the holographic meta-surface 300, $Y_{avg}$ is the average value of the surface admittance of the holographic meta-surface 300, and M is a modulation depth.

Further, the holographic meta-surface 300 may be designed using the average value of surface admittance $Y_{avg}=1$ and the modulation depth M=0.6 as parameters.

Figure 4:
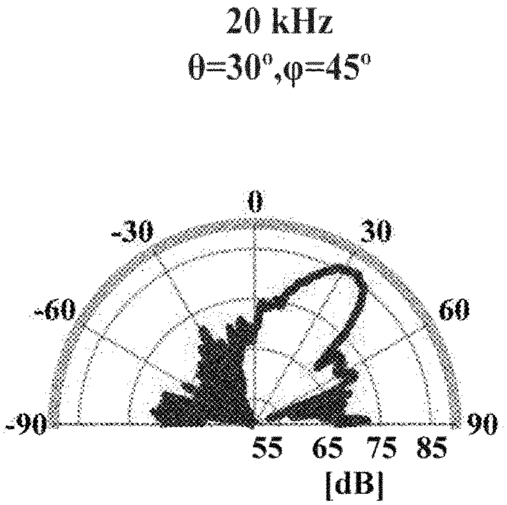
FIG. 4 is an image of a peak sound pressure level according to an XZ plane showing the state in which a sound wave is emitted in a beam splitting type at another specific frequency from the holographic-based directional audio device of the related art.

In this case, a frequency scanning phenomenon in which the sound wave emitted in a radiation wave type from the holographic meta-surface 300 on the surface of the flat plate 200 is emitted in a beam splitting type rather than a single beam type at a specific frequency, as shown in FIG. 4, may be generated.

Such a frequency scanning phenomenon in which a sound wave is emitted in a beam splitting type may be generated, as shown in FIG. 1, when the holographic meta-surface 300 is designed to have surface admittance including both of not only a forward dominant region implementing a forward emission mode of emitting a radiation wave according to a sound wave in a forward direction the same as the traveling direction of a surface wave, but also a backward dominant region implementing a backward emission mode of emitting a radiation wave in a backward direction opposite to the traveling direction of the surface wave.

Accordingly, in order to prevent the frequency scanning phenomenon in which a sound wave is emitted in a beam splitting type due to variation of the frequency, the holographic meta-surface 300 needs to be designed to have surface admittance having any one mode of a forward emission mode of emitting a sound wave in a forward direction and a backward emission mode of emitting a sound wave in a backward direction.

That is, in order to emit a sound wave in a forward emission mode through the flat plate 200, as shown in FIG. 7, the holographic meta-surface 300 of the flat plate 200 needs to be designed such that the surface admittance having a forward emission mode overwhelmingly dominates the surface admittance having a backward emission mode.

Further, in order to emit a sound wave in a backward emission mode through the flat plate 200, as shown in FIG. 9, the holographic meta-surface 300 of the flat plate 200 needs to be designed such that the surface admittance having a backward emission mode overwhelmingly dominates the surface admittance having a forward emission mode.

In this case, frequency variation of a sound wave should be considered with the holographic meta-surface 300 for the frequency scanning phenomenon, and sine wave phase distribution according to an interference pattern of a surface wave and a radiation wave can be defined by the following Equation 4.

$$\mathrm{Re}\left(\Psi_{surf}^{*}\Psi_{rad}\right) \quad \text{[Equation 4]}$$

Further, the holographic meta-surface 300 interferes with a reference surface wave $$\left(\Psi'_{surf} = e^{-jk'n'x}\right)$$

having another frequency k'. However, k' is a frequency $$\left(k' = \frac{2\pi}{\lambda}\right)$$

in a free space and n' is an effective refractive index.

Accordingly, the phase Φ of the radiation wave according to the holographic meta-surface 300 can be defined as in the following Equation 5 and the surface wave can be defined as in the following Equation 6 when the elevation angle θ and the azimuth φ are 30° and 45°, respectively.

$$\Phi = \Psi'_{surf}\left(\Psi_{surf}^{*}\Psi_{rad}\right) \quad \text{[Equation 5]}$$

$$\Psi_{rad} = e^{\mp j\sin(\theta)k[x\cos(\varphi)+y\sin(\varphi)]} \quad \text{[Equation 6]}$$

where '−' and '+' respectively mean radiation waves in a backward emission mode and a forward emission mode according to the interference relationship of a radiation wave and a surface wave when x>0 and y>0. Accordingly, the phases of a radiation wave according to the x and y directions can be respectively defined by the following Equation 7.

$$\Phi_x = (k'n' - kn)x \pm k\sin(\theta)\cos(\varphi)x \quad \text{[Equation 7]}$$

$$\Phi_y = (k'n' - kn)y \pm k\sin(\theta)\cos(\varphi)y$$

where '_' and '+' respectively mean the phases of radiation waves in a backward emission mode and a forward emission mode according to the interference relationship of a radiation wave and a surface wave when x>0 and y>0. Accordingly, the frequencies according to x and y directions can be respectively calculated by the following Equation 8.

$$k'_{sx} = (k'n' - kn) \pm k\sin(\theta)\cos(\varphi) \quad \text{[Equation 8]}$$

$$k'_{sy} = (k'n' - kn) \pm k\sin(\theta)\sin(\varphi)$$

Further, the amplitude of a frequency can be calculated by the following Equation 9.

$$k'_s = \sqrt{k'^2_{sx} + k'^2_{sy}} \quad \text{[Equation 9]}$$

Further, since $$k'_s \le k',$$

an elevation angle θ' and an azimuth φ' can be respectively defined as in the following Equations 10 and 11.

$$\theta' = \sin^{-1}\left(\frac{k'_s}{k'}\right) \quad \text{[Equation 10]}$$

$$\varphi' = \tan^{-1}\left(\frac{k'_{sy}}{k'_{sx}}\right) \quad \text{[Equation 11]}$$

According to the result of simulation, the azimuth φ' does not change with a frequency under the condition $$k'_{sx} = k'_{sy},$$

but when the frequency k' increases, $$\frac{k'_s}{k'}$$

increases in the forward emission mode and decreases in the backward emission mode.

That is, when the frequency of a sound wave increases, the azimuth of a radiation wave according to the sound wave increases in proportion to the frequency in the forward emission mode and the azimuth of a radiation wave according to the sound wave decreases in inverse proportion to the frequency in the backward emission mode.

Accordingly, the emission angle of a sound wave in the forward emission mode and the emission of the sound wave in the backward emission mode differently changes in accordance with frequency variation of the sound wave, a frequency scanning phenomenon in which a sound wave is emitted in a beam splitting type is generated.

Consequently, in order to prevent the frequency scanning phenomenon in which a sound wave is emitted in a beam splitting type, a holographic meta-surface 300 in which the ratio of the surface admittance having a forward emission mode is dominant needs to be designed on the surface of the flat plate 200 or a holographic meta-surface 300 in which the ratio of the surface admittance having a backward emission mode is dominant needs to be designed on the surface of the flat plate 200.

To this end, one flat plate 200 can be machined by designing a holographic meta-surface 300 in accordance with a combination of a plurality of unit cells 320, forming the designed holographic meta-surface 300 on a complex flat plate positioned at the center of the sound wave generator 100, and then cutting the complex flat plate with a predetermined angle radius on the basis of the position of the sound wave generator 100.

Figure 8:
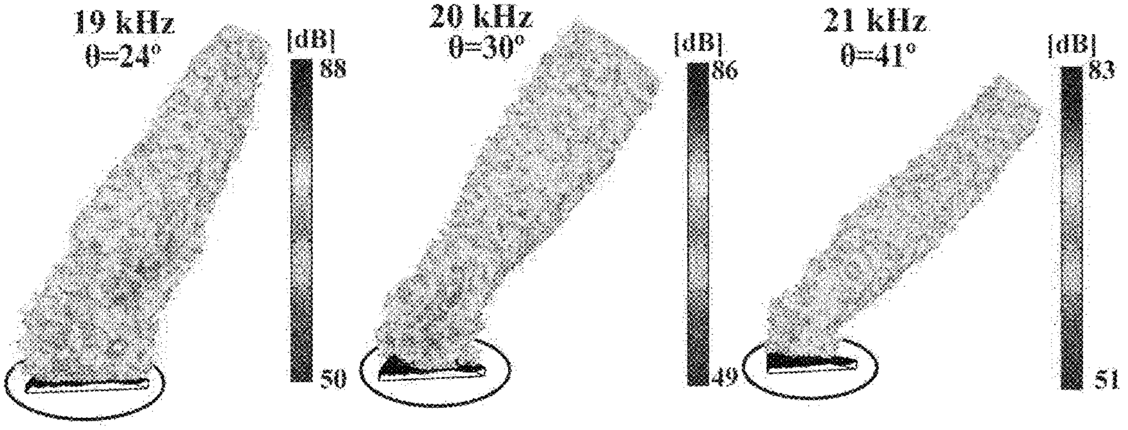
FIG. 8 is a 3D view showing the state in which an elevation angle of a sound wave increases with an increase of the frequency of the sound wave by the holographic meta-surface for a forward emission mode of FIG. 7.

In this case, when the ratio of the surface admittance of emitting a sound wave in a forward emission mode of the holographic meta-surface 300 dominantly overwhelms the ratio of the surface admittance of emitting a sound wave in a backward emission mode, as shown in FIG. 8, as the frequency of a sound wave increases, the elevation angle of the sound wave also increases, whereby the flat plate 200 can implement the forward emission mode of emitting a sound wave in the forward direction.

Figure 10:
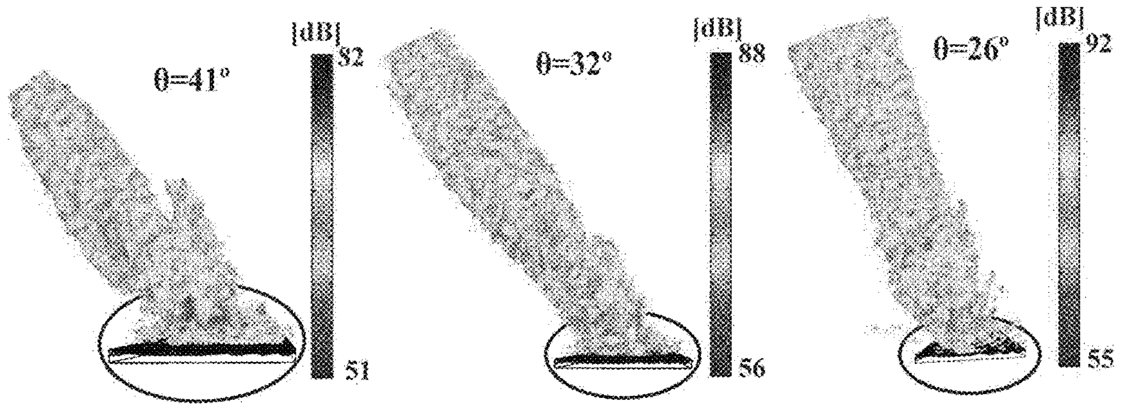
FIG. 10 is a 3D view showing the state in which an elevation angle of a sound wave decreases with an increase of the frequency of the sound wave by the holographic meta-surface for a backward emission mode of FIG. 9.

On the contrary, when the ratio of the surface admittance of emitting a sound wave in a backward emission mode of the holographic meta-surface 300 dominantly overwhelms the ratio of the surface admittance of emitting a sound wave in a forward emission mode, as shown in FIG. 10, as the frequency of a sound wave increases, the elevation angle of the sound wave decreases, whereby the flat plate 200 can implement the backward emission mode of emitting a sound wave in the backward direction.

Further, when a plurality of flat plates 300 having a holographic meta-surface 300 of a forward emission mode or a backward emission mode are disposed at predetermined angles around an insertion hole and integrally connected, it is possible to emit a sound wave in a multi-beam type that emits a plurality of separate sound waves at different angles.

Figure 11:
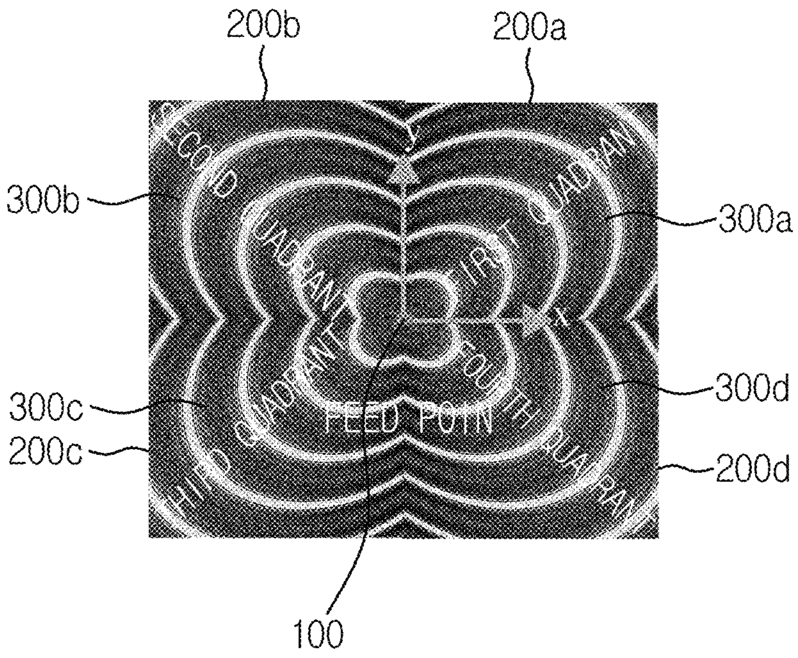
FIG. 11 is a plan view showing a first embodiment of the holographic-based directional audio device capable of sound wave scanning according to the present disclosure.

It is possible to emit a sound wave in a multi-beam type by disposing a first flat plate 200*a*, a second flat plate 200*b*, a third flat plate 200*c*, and a fourth flat plate 200*d* having holographic meta-surfaces 300 of the same forward emission mode in the first quadrant, the second quadrant, the third quadrant, and the fourth quadrant, respectively, as shown in FIG. 11, in accordance with the first embodiment.

However, the second holographic meta-surface 300*b* of the second flat plate 200*b* disposed in the second quadrant becomes a form obtained by mirroring, in the left-right direction, the first holographic meta-surface 300*a* of the first flat plate 200*a* disposed in the first quadrant, the third holographic meta-surface 300 of the third flat plate 200*c* disposed in the third quadrant becomes a form obtained by mirroring, in the diagonal direction, the first holographic meta-surface 300 of the first flat plate 200*a* disposed in the first quadrant, and the fourth holographic meta-surface 300 of the fourth flat plate 200*d* disposed in the fourth quadrant becomes a form obtained by mirroring, in the up-down direction, the first holographic meta-surface 300 of the first flat plate 200*a* disposed in the first quadrant.

Accordingly, the holographic meta-surfaces 300 of the flat plates 200 become forms obtained by mirroring each other in accordance with the positions, so they have different surface admittance in the XY plane and can emit four separate sound waves at different angles in a forward emission mode.

In this configuration, radiation waves of sound waves according to the first holographic meta-surface 300*a*, the second holographic meta-surface 300*b*, the third holographic meta-surface 300*c*, and the fourth holographic meta-surface 300*d* of the first flat plate 200*a*, the second flat plate 200*b*, the third flat plate 200*c*, and the fourth flat plate 200*d* can be respectively expressed into the equations of FIG. 22.

Figure 12:
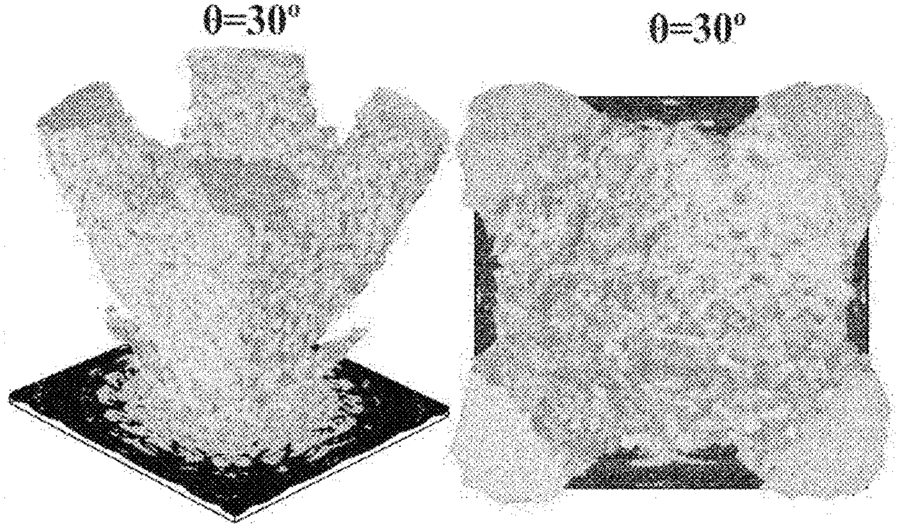
FIG. 12 is a 3D image of a sound wave showing a multi-beam emission type according to FIG. 11.

In this configuration, the first holographic meta-surface 300*a*, the second holographic meta-surface 300*b*, the third holographic meta-surface 300*c*, and the fourth holographic meta-surface 300*d* of the first flat plate 200*a*, the second flat plate 200*b*, the third flat plate 200*c*, and the fourth flat plate 200*d* can be designed to emit sound waves at an elevation angle of 30° and azimuths of 45°, 135°, 225°, and 315°, respectively, as in the 3D images of sound wave shown in FIG. 12.

Figure 13:
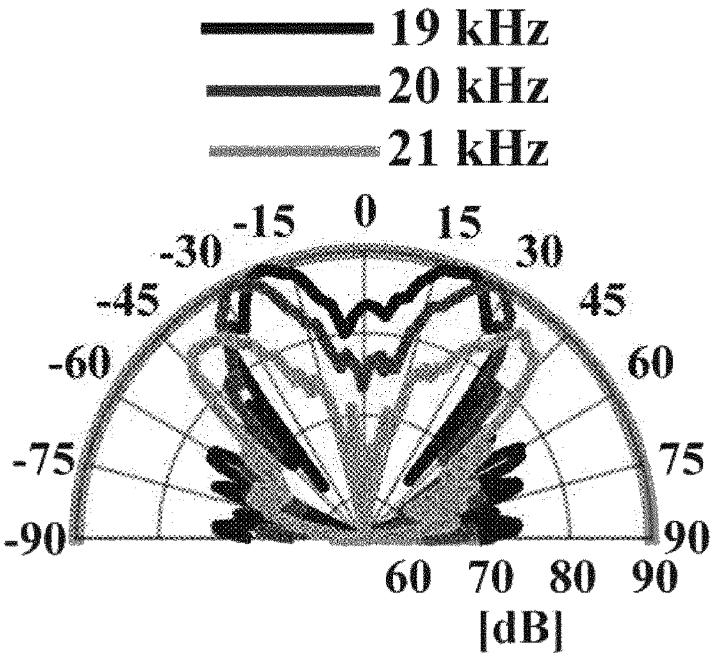
FIG. 13 is an image of a peak sound pressure level according to an XZ plane showing the relationship between the elevation angle and the frequency of the sound wave according to FIG. 11.

Accordingly, the first holographic meta-surface 300*a*, the second holographic meta-surface 300*b*, the third holographic meta-surface 300*c*, and the fourth holographic meta-surface 300*d* of the first flat plate 200*a*, the second flat plate 200*b*, the third flat plate 200*c*, and the fourth flat plate 200*d* can emit sound waves at elevation angles of 20°, 30°, and 42°, respectively, from the XZ plane shown in FIG. 13 when the frequency of the sound waves are changed to 19 kHz, 20 kHz, and 21 kHz like the peak sound pressure level according to the XZ plane.

Figure 14:
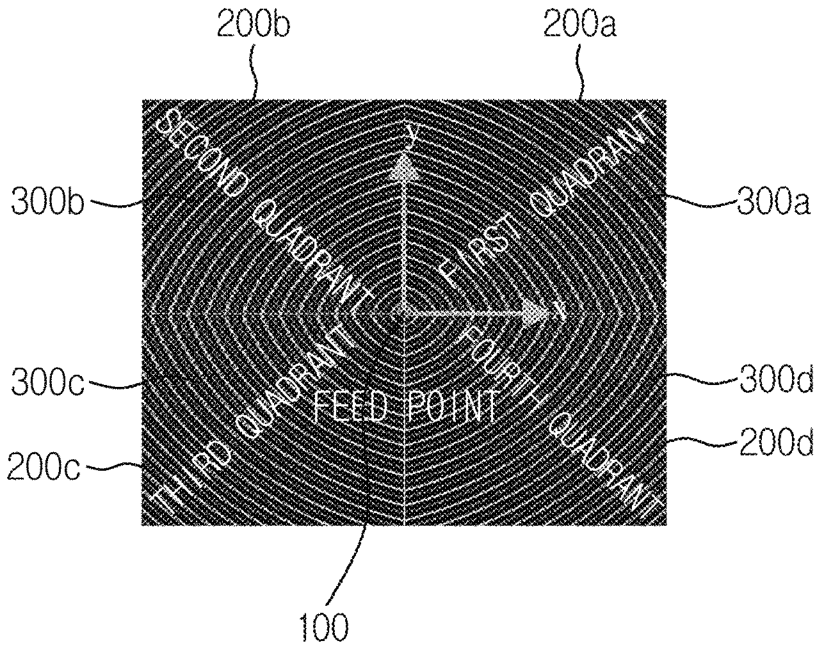
FIG. 14 is a plan view showing a second embodiment of the holographic-based directional audio device capable of sound wave scanning according to the present disclosure.

It is possible to emit a sound wave in a multi-beam type by disposing four flat plates having holographic meta-surfaces 300 having the same backward emission mode in the first quadrant, the second quadrant, the third quadrant, and the fourth quadrant, respectively, as shown in FIG. 14, in accordance with the second embodiment.

However, the second holographic meta-surface 300*b* of the second flat plate 200*b* disposed in the second quadrant becomes a form obtained by mirroring, in the left-right direction, the first holographic meta-surface 300*a* of the first flat plate 200*a* disposed in the first quadrant, the third holographic meta-surface 300*c* of the third flat plate 200*c* disposed in the third quadrant becomes a form obtained by mirroring, in the diagonal direction, the first holographic meta-surface 300*a* of the first flat plate 200*a* disposed in the first quadrant, and the fourth holographic meta-surface 300*d* of the fourth flat plate 200*d* disposed in the fourth quadrant becomes a form obtained by mirroring, in the up-down direction, the first holographic meta-surface 300*a* of the first flat plate 200*a* disposed in the first quadrant.

Accordingly, since the first holographic meta-surface 300*a*, the second holographic meta-surface 300*b*, the third holographic meta-surface 300*c*, and the fourth holographic meta-surface 300*d* of the first flat plate 200*a*, the second flat plate 200*b*, the third flat plate 200*c*, and the fourth flat plate 200*d* become forms obtained by mirroring each other in accordance with the positions, they have different surface admittance in the XY plane and can emit four separate sound waves at different emission angles in the backward emission mode.

In this configuration, radiation waves of sound waves according to the first holographic meta-surface 300*a*, the second holographic meta-surface 300*b*, the third holographic meta-surface 300*c*, and the fourth holographic meta-surface 300*d* of the first flat plate 200*a*, the second flat plate 200*b*, the third flat plate 200*c*, and the fourth flat plate 200*d* can be respectively expressed into the equations of FIG. 23.

Figure 15:
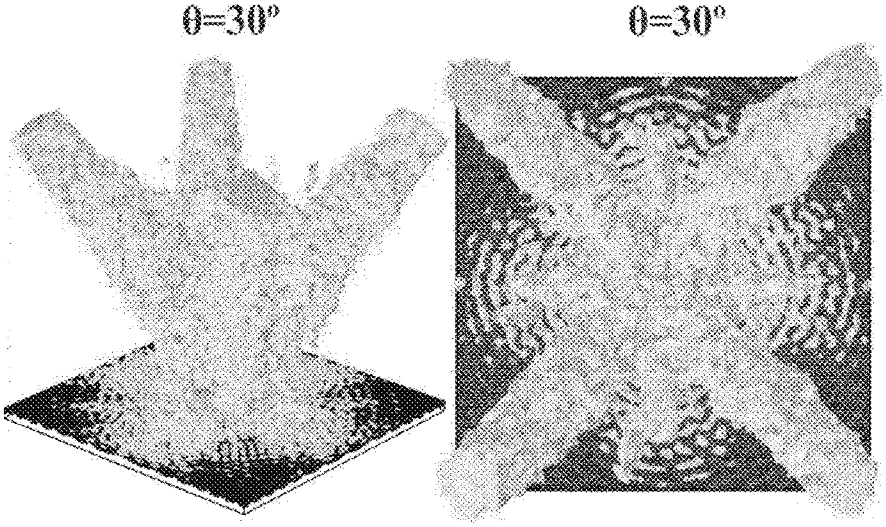
FIG. 15 is a 3D image of a sound wave showing a multi-beam emission type according to FIG. 14.

In this configuration, the first holographic meta-surface 300*a*, the second holographic meta-surface 300*b*, the third holographic meta-surface 300*c*, and the fourth holographic meta-surface 300*d* of the first flat plate 200*a*, the second flat plate 200*b*, the third flat plate 200*c*, and the fourth flat plate 200*d* can be designed to emit sound waves at an elevation angle of 30° and azimuths of 45°, 135°, 225°, and 315°, respectively, as in the 3D images of sound wave shown in FIG. 15.

Figure 16:
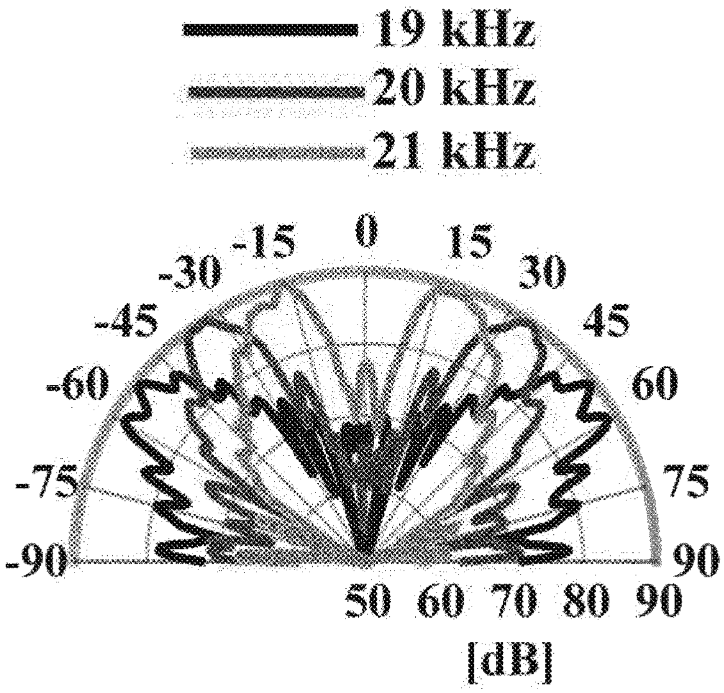
FIG. 16 is an image of a peak sound pressure level according to an XZ plane showing the relationship between the elevation angle and the frequency of the sound wave according to FIG. 14.

Accordingly, the first holographic meta-surface 300*a*, the second holographic meta-surface 300*b*, the third holographic meta-surface 300*c*, and the fourth holographic meta-surface 300*d* of the first flat plate 200*a*, the second flat plate 200*b*, the third flat plate 200*c*, and the fourth flat plate 200*d* can emit sound waves at elevation angles of 46°, 32°, and 23°, respectively, from the XZ plane shown in FIG. 16 when the frequency of the sound waves are changed to 19 kHz, 20 kHz, and 21 kHz like the peak sound pressure level according to the XZ plane.

Figure 17:
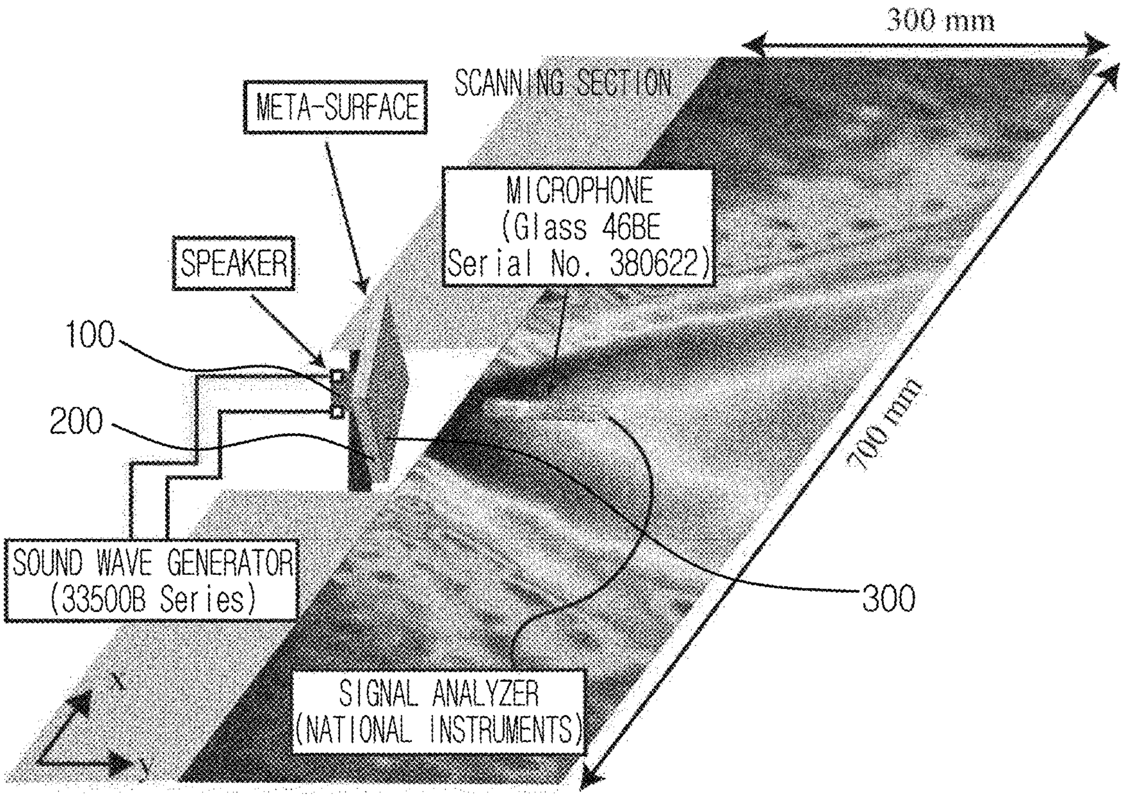
FIG. 17 is an exemplary view showing test facility and environment for performing a sound pressure level test on the holographic-based directional audio device capable of sound wave scanning according to the present disclosure.

Sound pressure level tests were performed on the first embodiment and the second embodiment described above using the test equipment and environment of FIG. 17.

The holographic-based directional audio device according to the first embodiment was designed in a structure in which a first flat plate 200*a*, a second flat plate 200*b*, a third flat plate 200*c*, and a fourth flat plate 200*d* of a forward emission mode, which are made of ABS resin and have a size of 240 mm×240 mm and in each of which a plurality of unit cells 320 having a plurality of cylindrical grooves 310 disposed in a hexagonal pattern on the surface is continuously formed, are disposed in the first quadrant, the second quadrant, the third quadrant, and the fourth quadrant and coupled to each other, the total number of the grooves 310 is 14,581, and a hole are formed at the center such that the sound of a speaker is discharged.

Further, the holographic-based directional audio device according to the second embodiment was designed in a structure in which a first flat plate 200*a*, a second flat plate 200*b*, a third flat plate 200*c*, and a fourth flat plate 200*d* of a backward emission mode, which are made of ABS resin and have a size of 240 mm×240 mm and in each of which a plurality of unit cells 320 having a plurality of cylindrical grooves 310 disposed in a hexagonal pattern on the surface is continuously formed, are disposed in the first quadrant, the second quadrant, the third quadrant, and the fourth quadrant and coupled to each other, the total number of the grooves 310 is 14,581, and a hole are formed at the center such that the sound of a speaker is discharged.

Meanwhile, a scanning region for measuring sound pressure was limited to an area of 700 mm×300 mm in the XY plane and a GRAS 46BE ¼-inch microphone having a step size of 10 mm in both of X direction and Y direction was used.

Figure 18:
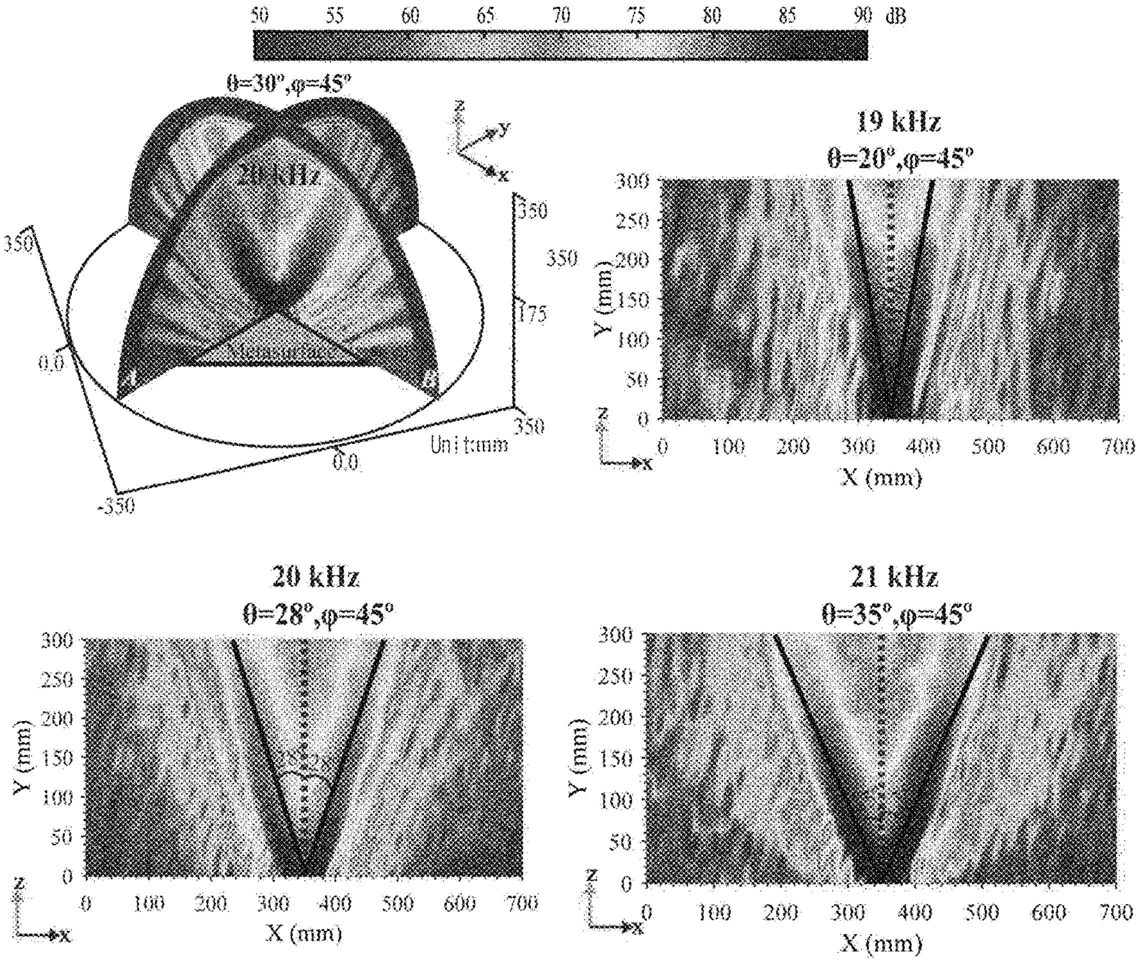
FIG. 18 is a sound pressure level map image showing emission angle variation of a sound wave according to frequency variation of the sound wave to show the result of a sound pressure level test on the first embodiment of the holographic-based directional audio device capable of sound wave scanning according to the present disclosure.

According to the test result of the first embodiment, as shown in FIG. 18, it could be seen from a sound pressure level map image that the first embodiment was designed to emit sound waves in four directions at an elevation angle of 30° in a forward emission mode when the frequency of the sound wave was 20 kHz, and it could be seen from a sound pressure map image according to a surface normal that when the frequency of the sound wave increased to 19 kHz, 20 kHz, and 21 kHz, the elevation angle of the sound wave was also adjusted to 20°, 28°, and 35°, respectively, in proportion to the frequency of the sound wave.

Figure 19:
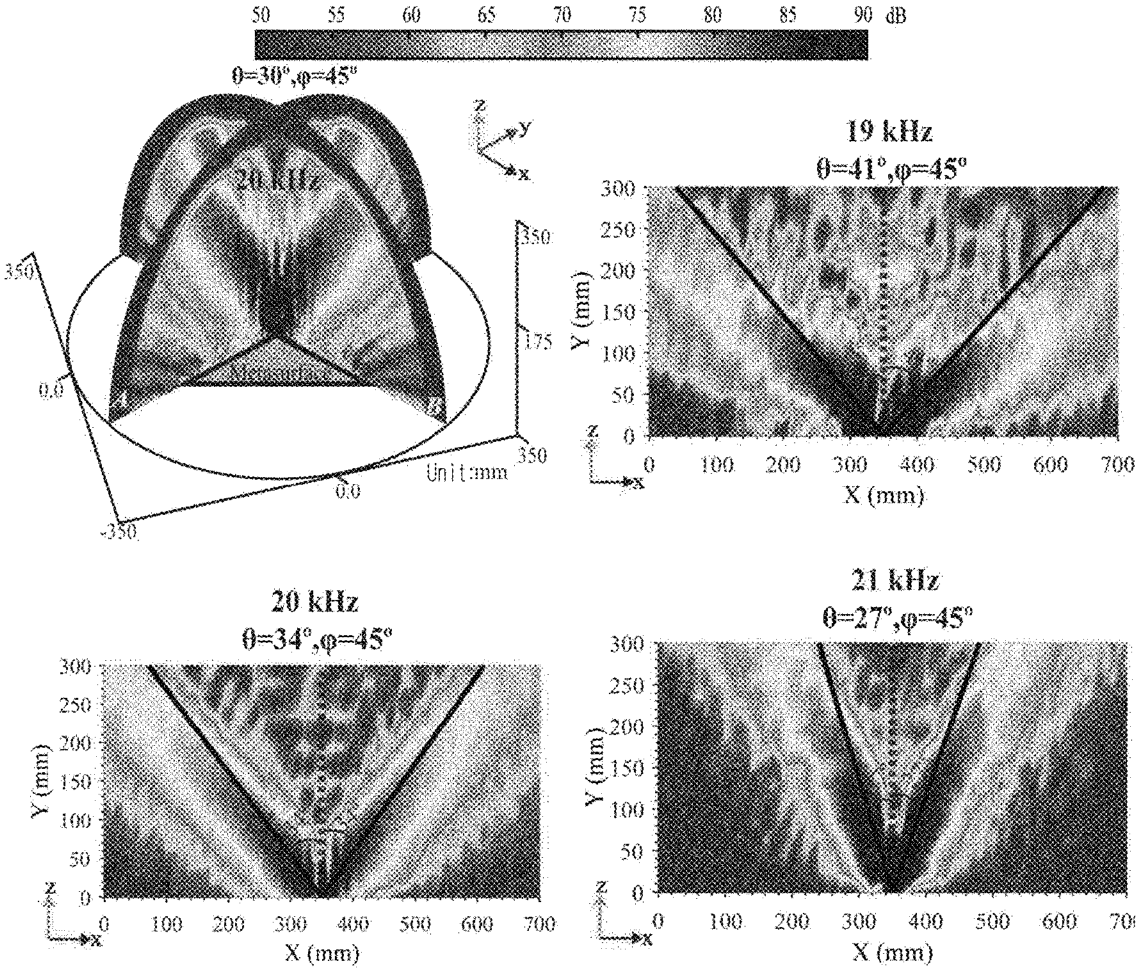
FIG. 19 is a sound pressure level map image showing emission angle variation of a sound wave according to frequency variation of the sound wave to show the result of a sound pressure level test on the second embodiment of the holographic-based directional audio device capable of sound wave scanning according to the present disclosure.

According to the test result of the second embodiment, as shown in FIG. 19, it could be seen from a sound pressure level map image that the second embodiment was designed to emit sound waves in four directions at an elevation angle of 30° in a backward emission mode when the frequency of the sound wave was 20 kHz, and a backward emission mode in which when the frequency of the sound wave increased to 19 kHz, 20 kHz, and 21 kHz, the elevation angle of the sound wave was also adjusted to 41°, 34°, and 27°, respectively, in inverse proportion to the frequency of the sound wave can be seen from a sound pressure map image according to a surface normal.

Figure 20:
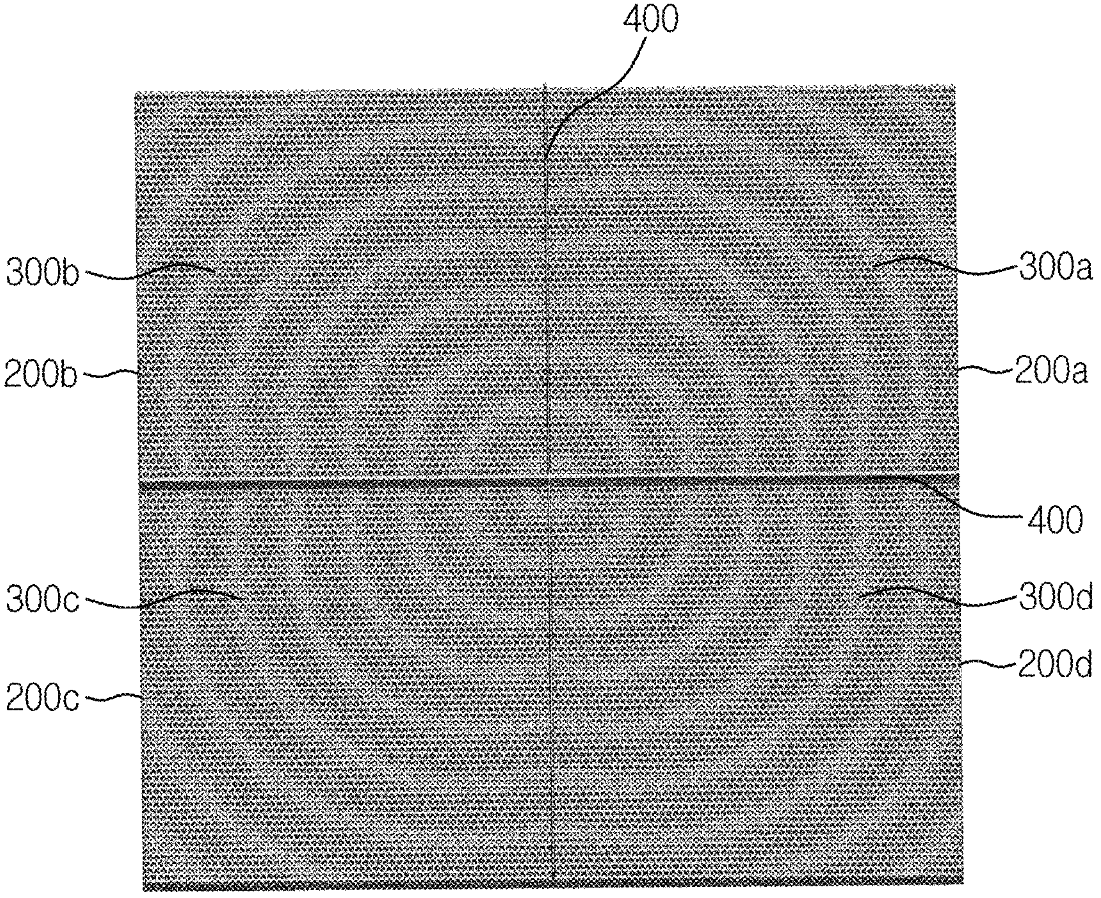
FIG. 20 is an exemplary view showing the state in which anti-interference walls have been added to the first embodiment of the holographic-based directional audio device capable of sound wave scanning according to the present disclosure.

Meanwhile, in the structure in which a plurality of flat plates 200 is connected to each other to emit a sound wave in a multi-beam type, anti-interference walls 400 protruding to have a predetermined height may be formed along the boundaries of the flat plates 200, as shown in FIGS. 20 and 21, to separate the holographic meta-surfaces 300 formed on the surfaces of the flat plates 200, respectively.

The anti-interference wall 400 blocks a surface wave traveling on the holographic meta-surface 300 of a flat plate 200 by a sound wave such that the surface wave does not interfere with another surface wave traveling on the holographic meta-surface 300 of an adjacent another flat plate 200, whereby it is possible to prevent a surface wave from interfering with adjustment of the direction of a sound wave accompanying a change of the frequency of the sound wave.

Finally, the sound wave receiver can receive a sound wave emitted at a preset angle from the surface of the flat plate 200 by the holographic meta-surface 300.

The embodiments described above are only examples and those skilled in the art may achieve various modified embodiments from the above embodiments.

Accordingly, not only the embodiments described above, but various modified embodiments should be included in the true technical protective range of the present disclosure by the spirit of the present disclosure described in the following claims.

INDUSTRIAL APPLICABILITY

The holographic-based directional audio device capable of sound wave scanning according to the present disclosure can be generally used in a directional sound field requiring implementation of the function of emitting a sound wave in a multi-beam type by emitting a sound wave with directionality in the emission angle through a frequency change of the sound wave, by emitting a plurality of separate sound waves at different angles, and by preventing interference between sound waves.

The invention claimed is:

1. A holographic-based directional audio device capable of sound wave scanning to adjust an emission angle of a sound wave through a frequency change of the sound wave, the holographic-based directional audio device comprising:

a sound wave generator configured to generate the sound wave;

a flat plate positioned at a side of the sound wave generator; and a holographic meta-surface composed of a plurality of unit cells, each of which comprises a plurality of grooves formed on a surface of the flat plate and which is continuously arrayed, and configured to emit the sound wave, wherein a depth of the grooves constituting the holographic meta-surface is determined by surface admittance calculated on the basis of a cosine function or a sine function of a sum of a first value that is a product of a frequency of the sound wave, a refractive index according to a surface of the unit cell, and a radius distance from a center of the flat plate to the unit cell and a second value that is a product of the frequency of the sound wave, a position value of the unit cell, and an emission angle of the sound wave on the basis of preset emission angle and frequency of the sound wave, and the surface admittance makes the sound wave be emitted in a forward direction the same as a traveling direction of a surface wave traveling along the holographic meta-surface or a backward direction opposite to the traveling direction of the surface wave, so the emission angle of the sound wave can be adjusted in accordance with frequency variation of the sound wave.

2. The holographic-based directional audio device of claim 1, wherein the flat plate comprises a plurality of flat plates disposed to be connected to each other around a position of the sound wave generator, and the flat plates have different holographic meta-surfaces to have different surface admittance in accordance with positions, so the flat plates can implement a multi-beam type in which the flat plates emit sound waves at different angles, respectively.

3. The holographic-based directional audio device of claim 2, wherein the holographic meta-surfaces formed on the plurality of flat plates are obtained by mirroring the holographic meta-surface formed on any one flat plate of the plurality of flat plates to correspond to each other in accordance with positions.

4. The holographic-based directional audio device of claim 3, further comprising anti-interference walls formed to protrude along boundaries of the plurality of flat plates and configured to prevent interference between reflective waves traveling along the holographic meta-surfaces, respectively, in accordance with a sound wave.

5. The holographic-based directional audio device of claim 4, wherein the plurality of flat plates comprises a first flat plates, a second flat plate, a third flat plate, and a fourth flat plate that have a rectangular shape, the first flat plate is disposed in a first quadrant, the second flat plate is disposed in a second quadrant, the third flat plate is disposed in a third quadrant, and the fourth flat plate is disposed in a fourth quadrant, the holographic meta-surface of the second flat plate is obtained by mirroring, in a left-right direction, the holographic meta-surface of the first flat plate, the holographic meta-surface of the third flat plate is obtained by mirroring, in a diagonal direction, the holographic meta-surface of the first flat plate, and the holographic meta-surface of the fourth flat plate is obtained by mirroring, in an up-down direction, the holographic meta-surface of the first flat plate, and the anti-interference walls are installed in a left-right direction and a front-rear direction along boundaries of the first flat plate, the second flat plate, the third flat plate, and the fourth flat plate.

* * * * *